Figure 1:
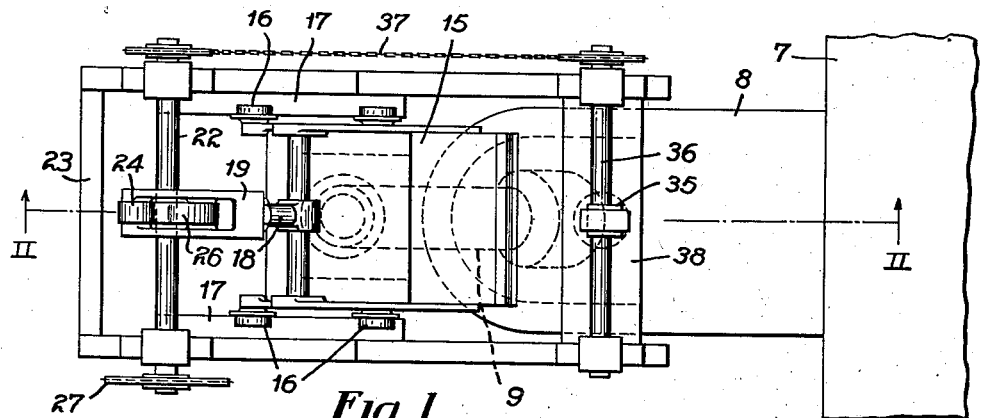

Dec. 1, 1936.  A. H. STEWART  2,062,619
GLASS FEEDING APPARATUS
Filed Jan. 21, 1935  2 Sheets-Sheet 1

INVENTOR
Andrew H. Stewart
By Archworth Martin
Attorney.

Dec. 1, 1936.  A. H. STEWART  2,062,619
GLASS FEEDING APPARATUS
Filed Jan. 21, 1935    2 Sheets-Sheet 2

INVENTOR
Andrew H. Stewart,
By Archworth Martin,
Attorney.

Patented Dec. 1, 1936

2,062,619

UNITED STATES PATENT OFFICE 2,062,619

GLASS FEEDING APPARATUS

Andrew H. Stewart, Shields, Pa., assignor to Ball Brothers Company, Muncie, Ind., a corporation of Indiana Application January 21, 1935, Serial No. 2,713

15 Claims. (Cl. 49—55)

My invention relates to the feeding and forming of small masses of glass or other molten metal to be employed as mold charges and the like, but is not necessarily limited thereto, because it may be utilized for the feeding of other viscous materials and is a continuation in part of my copending application Serial No. 711,742, filed February 17, 1934.

In the supplying of molten glass to forming molds from a batch of molten glass, various methods have been employed in order to produce mold charges of proper size and shape. Practically all of these former methods rely on gravity which they modify variously. Some of these methods involve the flowing of the glass through a spout or orifice to the molds, the flow of the stream being periodically interrupted to permit successive molds to be brought into glass-receiving position.

Other methods involve the use of apparatus of the air feeder type, wherein pressure and suction are applied alternately to the surface of the glass at the feeding orifice, in order to effect expulsive and retractive impulses, a severing shear being actuated in timed relation to such impulses. Expulsive and retractive impulses have also been secured by vertically reciprocating a plunger at the orifice.

These methods have a number of objections, among which is the excessive agitation of the glass above the orifice, which produces swirls that make for irregularity in the shape of the charges which are sheared at the lower side of the orifice, and which cause colder portions of the glass to be intermingled with hotter portions, as the glass is being discharged through the orifice. Again, surface impurities are caused to be carried through the orifice.

My invention has for its object the provision of a method and apparatus, whereby accurately-formed charges of glass are secured, without the objectionable features above-referred to.

Another object of my invention is to provide means whereby intermittent flow through the feeding orifice is more effectively controlled than in various prior art structures, where the feeding is primarily by controlled gravity flow.

Broadly stated, my invention involves the use of a bent tube or conduit, the ends of which are disposed downwardly. One end extends into a pool of molten glass, and the other end is located externally of the furnace boot or forehearth, and terminates in a plane that is either coincident with or above the plane of the glass level. Periodic pumping impulses are imparted to the glass to effect feeding thereof intermittently.

The tube is periodically reciprocated in a generally vertical direction, to effect pulsations of glass within the tube and the forming of suspended mold charges at the outer end of the tube which are cut off by shears operating in timed relation to the feeding impulses.

Figure 2:
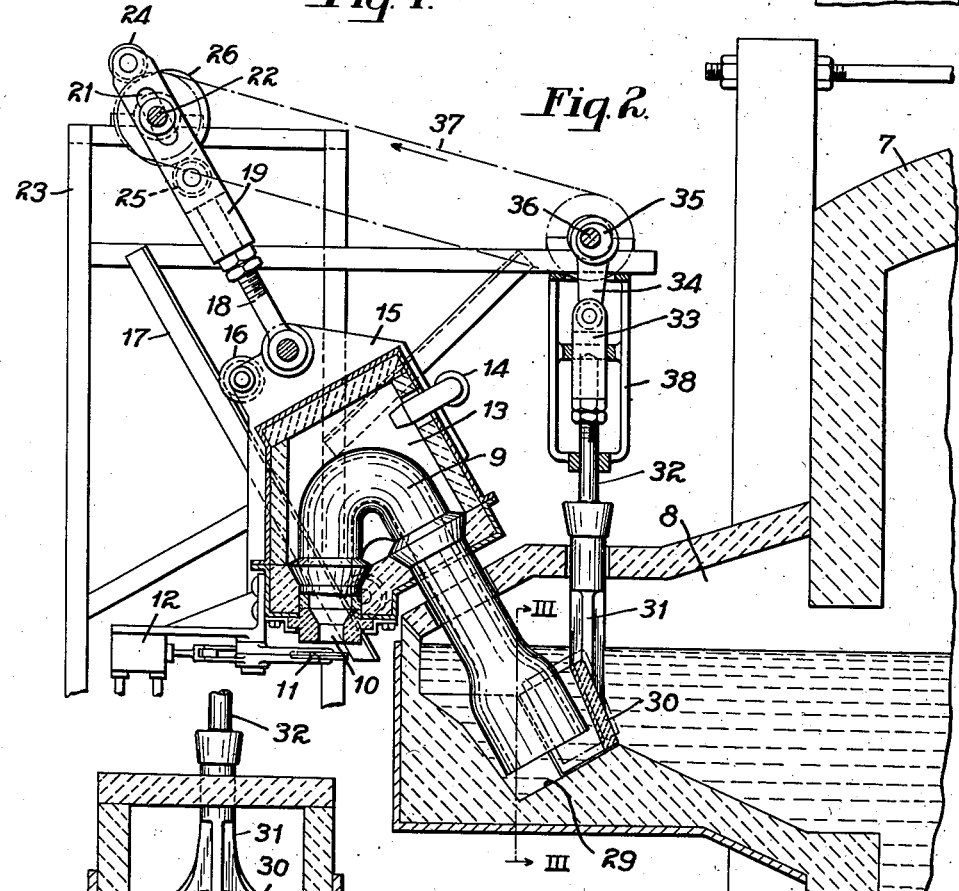
Figure 3:
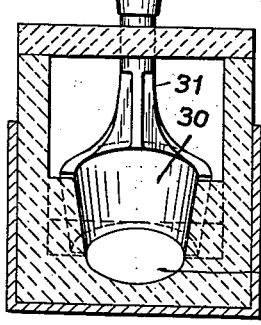
Figure 4:
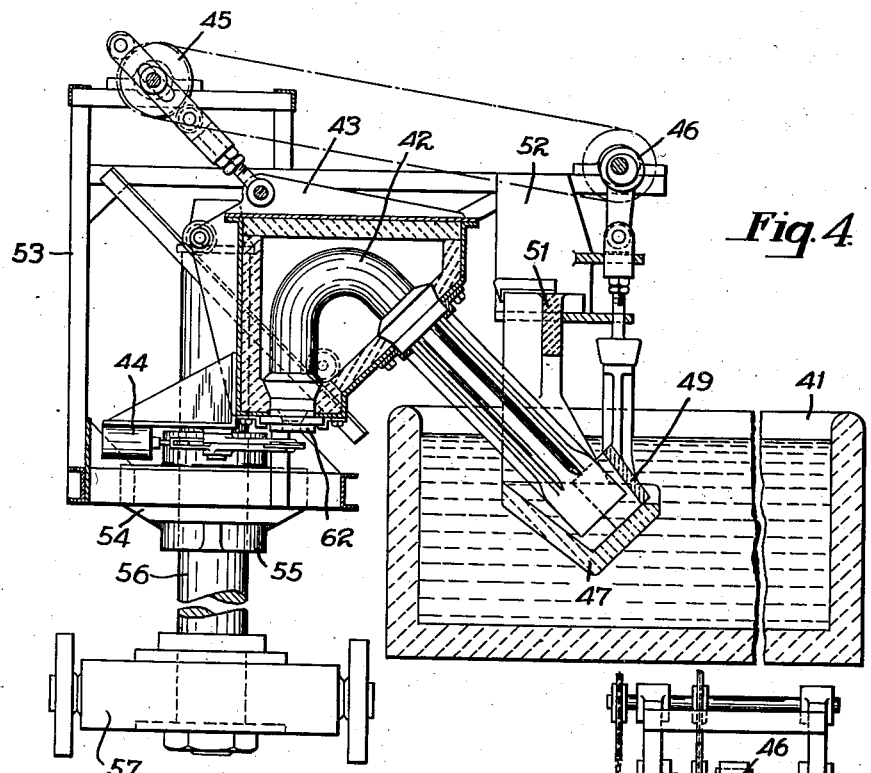
Figure 5:
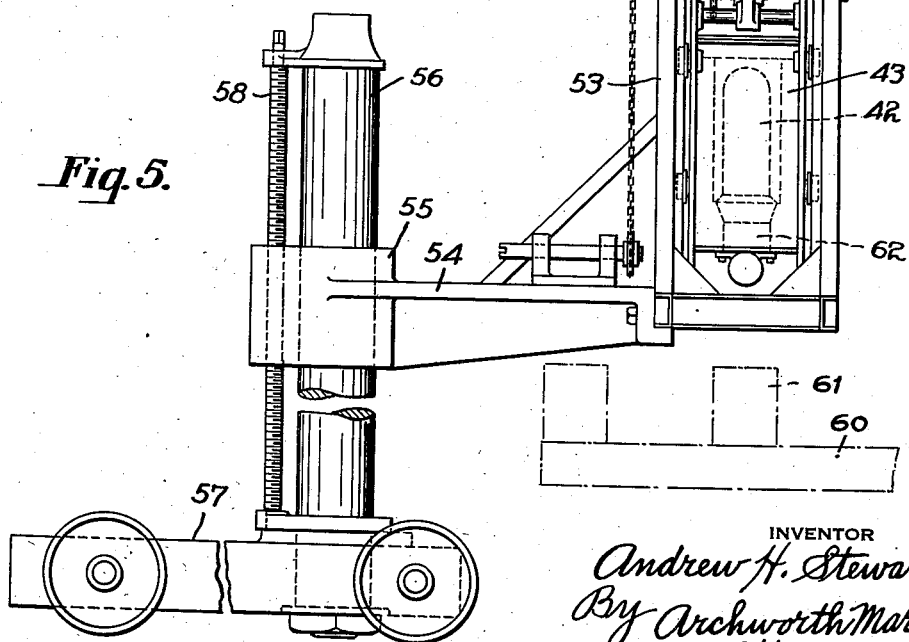

Some forms of apparatus for practicing my invention are shown in the accompanying drawings wherein Figure 1 is a plan view of a feeder structure and a portion of a glass furnace; Fig. 2 is a view taken on the line II—II of Fig. 1; Fig. 3 is an enlarged view, taken on the line III—III of Fig. 2; Fig. 4 is a view similar to Fig. 2, but showing a modification of such structure, and Fig. 5 is an end view of the structure of Fig. 4.

Referring first to Figs. 1 to 3, I show a portion of a glass-melting furnace 7 having a boot or forehearth 8. Instead of the glass being fed by periodically controlled gravity flow through an orifice in the bottom of the boot 8 as is common in the glass-feeding art, I provide a tube 9 which is of bent form, and the inner end of which extends into the molten glass within the boot, while the outer end terminates in a plane at or slightly higher than the glass level. An orifice ring or bushing 10 is detachably mounted at the outer end of the tube 9, the glass being discharged from the orifice past shears 11 that are periodically operated by a piston and cylinder device 12 in the usual manner to sever the mold charges.

The feeding tube 9 is contained in a heating chamber 13 with which a flexible tube 14 is connected for the supply of gas or other heating medium, which will prevent chilling of the molten glass within the tube. The tube 9, bushing 10, shears 11, operating cylinder 12, and the chamber 13 are mounted on a carriage or sliding bracket 15 which is provided with wheels 16 that run on inclined tracks 17. The carriage 15 has pivotal connection with an eye-bolt 18 that has screw-threaded connection with a yoke 19. The yoke 19 is provided with slots 21 whereby it is slidably supported on a shaft 22 that is journalled in the framework 23. The yoke is also provided with rollers 24 and 25 that are engaged by a cam disc 26 which is mounted on the shaft 22, so that as the shaft is driven, the cam will effect positive movement of the carriage 15 in its inclined path of travel.

The shaft 22 carries a sprocket 27 that may be driven from any suitable source of power, from which source of power timing valves for the shear-operating cylinder 12 may also be actuated, so that there is properly timed relation or synchronism between the operation of the shears and the movement of the feeding tube 9. The inner end of the tube 9 extends into a well that is formed by a stationary block 29 and a movable block 30. I find it desirable to flare the inner end of the tube 9, and also to flare the well, as shown more clearly in Fig. 2, but such flaring is not essential to the operation of the device.

The well portion 30 which is of generally semi-cylindrical form has an extension 31 which is connected to a bolt or screw-threaded bar 32 that in turn has screw-threaded engagement with a socket 33. The socket 33 is pivotally connected to an eccentric arm 34 that is operated by an eccentric 35. The eccentric 35 is carried by the shaft 36 which is driven from the shaft 22, through a drive chain 37, and suitable sprockets. A guide bracket 38 is provided for insuring proper vertical movements of the well section 30.

In the operation of the pump or feeder, the tube may be filled with molten glass by temporarily applying suction at the orifice 10, or in some other suitable manner. When the tube 9 has become filled with glass, and the well section 30 in its lowermost position, at which its edges engage the edges of section 29, lowering movement of the carriage 15 will move the tube 9 into the well, and cause glass to be forced from the bottom of the well up through the tube, since the clearance space between the periphery of the tube 9 and the inner wall of the well is such that glass cannot readily escape through such space. The result is that a flow impulse is created within the tube 9, and at the orifice 10. The rate of flow will depend upon the shape of the cam which actuates the movement of the carriage 15. If the well section 30 is spaced slightly from the section 29 when the tube is being moved into the well, the flow impulse will not, of course, be so great as with the sections 29 and 30 closely engaging one another, because glass will be permitted to escape past the opposed edges of the said well sections.

An impulse having been imparted to the glass through lowering movement of the carriage 15 and the feeding tube, through engagement of the raised surface of the cam 26 with the roller 25, retractive movement of the carriage and tube is effected by the raised cam surface coming into engagement with the roller 24. This retractive movement of the tube 9 will cause a suctional force to be created at the inner end of the tube, by reason of its partial withdrawal from the well, and increased height of glass column on the furnace side of tube 9, and this suctional impulse will be transmitted throughout the mass of glass in the tube and the orifice 10, causing a stopping of glass flow at the orifice. The suctional impulse may be of such degree that it will merely stop the flow of glass to the orifice, or it may be sufficient to create a slight back flow at the orifice, and thereby cause necking of the glass below the orifice, before the shearing operation. The suction could also be so great as to draw the cut stub back into the orifice, where it will be softened.

In view of the fact that the orifice 10 is never below the plane of the glass surface in the forehearth or boot, the flow action in the tube ceases the instant the pressure inside the well subsides. In other words, there is no feeding flow by siphonic action.

As soon as the flow in the tube stops, there is a natural necking of the glass at the orifice 10.

If the orifice 10 were at exactly the plane of the glass level in the forehearth or boot, the glass in the tube would remain motionless as soon as the pressure in the well section 30 becomes nil.

For all practical purposes it is best to arrange that the glass at orifice 10 will be in a plane slightly higher than the level of glass in the furnace forehearth or boot, because of variation in glass level that generally exists. In such case there is not only a necking action at the orifice 10, due to the cessation of flow outwardly through the orifice, but even greater necking action due to the tendency of the glass to reverse its direction of flow due to the higher column of glass in the furnace side of tube 9.

This tendency of the glass to reverse its flow will be materially augmented the instant the tube 9 starts on its upward motion. As a matter of fact the column of glass in tube 9 would be rapidly drawn back entirely into the furnace boot or forehearth, unless the well section 30 was removed from its seat and thereby permit glass easy access to the submerged end of the tube 9. This well section 30 may be removed from its seated position just before the completion of the downward movement of the tube 9, or just at its completion, and in some instances just after the tube 9 starts to move upwardly.

The degree of suctional impulse is controlled by movements of the well section 30 and the shape of the cam 26. Ordinarily, raising movement of the well section will be initiated approximately just before the carriage 15 is started on its upward movement, so that the suctional impulse will be of very short duration. When the well section 30 has moved sufficiently far from the section 29, glass may readily enter the well past the edges of the well sections, so that the suctional force is destroyed, and a new charge of glass may enter the well. Delay in lifting the well section 30 will increase the suctional force created within the tube 9. Adjustments for sizes of mold charges and degree of impulses within the feeding tube can be readily effected by the screw-threaded adjustment of the bolts 18 and 32. It will be obvious that feeding impulses and sizes of mold charges will depend also somewhat upon the distance which the tube 9 is moved into the well, and the speed of such movement.

Referring now to Figs. 4 and 5, I show a structure which is somewhat similar to that of Figs. 1 and 3, but which is portable, and of such form that it can be readily employed in the feeding of glass from a pot or from a "day tank" of well-known forms, without the necessity of providing pots or tanks of special construction.

In this structure the tank or pot is represented by the numeral 41. The feeding tube 42, carriage 43, shear mounting 44, cam mechanism 45, the eccentric device 46 may all be substantially of the form shown in Figs. 1 and 2. In this structure, the well portions 47 and 49 correspond to the well portions 29 and 30, respectively. However, the well portion 47 instead of being supported by the tank, has an extension 51 by means of which it is supported from a bracket 52, which is carried by the frame-work 53.

The well section 49 and the feeding tube 42 are reciprocated to effect feeding impulses in the same manner as the well section 30 and tube 9 of Fig. 2.

In order to facilitate the placing of the well sections 47, 49 and the tube 42 in a tank, I mount the framework 53 on a bracket arm 54 which has a sleeve-like portion 55 that is vertically slidable on a post 56. The post 56 is mounted on a truck frame 57, so that the feeder may be readily transported from one tank to another. A screw 58 is journalled on the truck frame and at the upper end of the column 56, has screw-threaded engagement with the sleeve 55, so that the framework 53 and the feeder carried thereby can be raised and lowered. The arm 54 extends forwardly from the truck frame so that the truck will not interfere with movements of a mold table 60, and molds 61 carried thereby, beneath the orifice 62 of the feeder.

Changes in the degree of pulsations in the feeding tubes may be effected independently of movement of one of the well sections away from and toward the other well section, by changes in the cam discs by which the tubes are reciprocated, and also by adjusting the distance which the tube will be projected into the bell on each down stroke. It will be seen that if the tube is lowered rapidly, there will be less opportunity for glass to escape from the well, and therefore a stronger feeding impulse. Also, if the tube is moved to approximately the bottom of the well, there will be more glass discharged through the tube than if it is not moved so closely to the well bottom.

I claim as my invention:—

1. The combination with a receptacle for molten glass, of a feeding device comprising a curved conduit having its inner end extending into the receptacle, to a plane below the normal glass level, and its outer end disposed exteriorly of the receptacle and extending downwardly, a well disposed below the glass level and partially encompassing the inner end of the conduit, means for reciprocating the conduit relative to the well, in directions generally parallel to the adjacent axial line of the conduit, and means for varying the effective area of communication between the well and the glass pool during reciprocal movements of the conduit, to such extent that the glass is caused to flow through the conduit by pulsating movements.

2. The combination with a receptacle for molten glass, of a feeding device comprising a curved conduit having its inner end extending downwardly into the receptacle, to a plane below the normal glass level, and its outer end disposed exteriorly of the receptacle and terminating in a plane above the said normal glass level, a well disposed below the glass level and partially encompassing the inner end of the conduit, means for reciprocating the conduit relative to the well, in directions generally parallel to the adjacent axial line of the conduit, and means for controlling impulses in the glass at the inner end of the conduit, during said reciprocating movements.

3. The combination with a receptacle for molten glass, of a feeding device comprising a curved conduit having its inner end extending downwardly into the receptacle, to a plane below the normal glass level, and its outer end disposed exteriorly of the receptacle and terminating at a plane above the said normal glass level, a well disposed below the glass level and partially encompassing the inner end of the conduit, means for reciprocating the conduit relative to the well, in directions generally parallel to the adjacent axial line of the conduit, and means for causing feeding and retractive impulses to the glass at the inner end of the conduit, with the feeding impulses predominating to such extent that glass is caused to issue intermittently from the outer end of the tube.

4. The combination with a receptacle for molten glass, of a feeding device comprising a curved conduit having its inner end extending downwardly into the receptacle, to a plane below the normal glass level, and its outer end disposed exteriorly of the receptacle and terminating at a plane slightly above the said normal glass level, a well disposed below the glass level and partially encompassing the inner end of the conduit, and means for reciprocating the conduit relative to the well, in directions generally parallel to the adjacent axial line of the conduit, the wall of the well being flared upwardly.

5. The combination with a receptacle for molten glass, of a feeding device comprising a curved conduit having its inner end extending downwardly into the receptacle, to a plane below the normal glass level, and its outer end extending downwardly exteriorly of the receptacle, a well disposed below the glass level and partially encompassing the inner end of the conduit, and means for reciprocating the conduit relative to the well, in directions generally parallel to the adjacent axial line of the conduit, the inner end of the tube being flared.

6. The combination with a receptacle for molten glass, of a feeding device comprising a curved conduit having its inner end extending downwardly into the receptacle, to a plane below the normal glass level, and its outer end extending downwardly exteriorly of the receptacle, a well disposed below the glass level and partially encompassing the inner end of the conduit, means for reciprocating the conduit relative to the well, in directions generally parallel to the adjacent axial line of the conduit, the well being made in separable parts, and means for moving said parts relative to one another.

7. The combination with a receptacle for molten glass, of a feeding device comprising a curved conduit having its inner end extending downwardly into the receptacle, to a plane below the normal glass level, and its outer end disposed exteriorly of the receptacle and terminating at a plane slightly above the said normal glass level, a well disposed below the glass level and partially encompassing the inner end of the conduit, means for reciprocating the conduit relative to the well, in directions generally parallel to the adjacent axial line of the conduit, the well being made in axially-divided parts, and means for moving said parts relative to one another.

8. Apparatus for feeding molten glass from a receptacle, comprising a curved conduit having its ends downwardly exposed, one of said ends terminating at a higher level than the other end, means for supporting said conduit with its lowermost end extending into the receptacle, and with its outermost end exteriorly of the receptacle, means for controlling the flow of glass from the receptacle into the conduit, means for reciprocating said conduit in a generally vertical direction, and means for raising the conduit out of cooperating relation with the receptacle.

9. Apparatus for feeding molten glass from a receptacle, comprising a curved conduit having its ends downwardly exposed, one of said ends terminating at a higher level than the other end, means for supporting said conduit with its lowermost end extending into the receptacle, and with its outermost end exteriorly of the receptacle, means for controlling the flow of glass from the receptacle into the conduit, means for reciprocating said conduit in a generally vertical direction, and means for raising the conduit out of cooperative relation with the receptacle, the said supporting means being mounted independently of the said receptacle.

10. Apparatus for feeding molten glass from a receptacle, comprising a curved conduit, having its ends downwardly exposed, one of said ends terminating at a higher level than the other end, means for supporting said conduit with its lowermost end extending into the receptacle, and with its outermost end exteriorly of the receptacle, a well carried by the supporting means and arranged to control flow of glass from the receptacle into the conduit, means for controlling the flow of glass from the receptacle into the conduit, means for reciprocating said conduit relative to the well, in a generally vertical direction, and means for raising the conduit out of cooperative relation with the receptacle, the said supporting means being mounted independently of the said receptacle.

11. The combination with a receptacle for molten glass, of a feeding device comprising a bent tube having one end projecting into the glass in said receptacle and the other end extending downwardly exteriorly of the receptacle, means for periodically reciprocating said tube, and means cooperating with the immersed end of said tube for creating a pressure impulse within said tube on movement thereof in one direction.

12. The combination with a receptacle for molten glass, of a feeding device comprising a bent tube having one end immersed in the glass within said receptacle and the other end extending downwardly exteriorly of the receptacle, means for reciprocating said tube, and movable means for trapping a quantity of glass in front of the immersed end of said tube as it moves in one direction to create a pressure impulse within said tube, said last-mentioned means being adapted to open communication between the end of said tube and the molten glass within said receptacle as said tube is moved in the opposite direction.

13. Apparatus for feeding molten glass from a receptacle containing a supply of such material comprising a bent tube having one end projecting into said receptacle and immersed in the material therein, means for reciprocating said tube to vary the depth of immersion in the material in said receptacle, and means for trapping a quantity of material adjacent the immersed end of said tube.

14. Apparatus for feeding molten glass from a receptacle containing such material comprising a bent tube having one end extending into said receptacle and immersed in such body of material, means for periodically segregating a quota of glass from the parent body, and means for moving such tube into and out of said segregated quota to alternately create a flow impulse and a suctional force within said tube.

15. Apparatus for feeding molten glass comprising in combination a receptacle for molten glass having a submerged well therein provided with a movable wall section, a bent tube having one end projecting into said receptacle and extending into said well, means for reciprocating said tube to vary the distance said tube extends into said well, and means for reciprocating said movable wall section in timed relation with the reciprocation of said tube.

ANDREW H. STEWART.